United States Patent
Ramasamy et al.

(10) Patent No.: US 9,319,459 B2
(45) Date of Patent: Apr. 19, 2016

(54) SERVICES CONTROLLED SESSION BASED FLOW INTERCEPTOR

(75) Inventors: Arivu Ramasamy, San Jose, CA (US); Jim Ervin, Wake Forest, NC (US); Martin Cieslak, Northville, MI (US); Zach Seils, Austin, TX (US); Venkataraman Anand, San Ramon, CA (US); Tom Black, Aptos, CA (US)

(73) Assignee: Cisco Technology, Inc., San Jose, CA (US)

( * ) Notice: Subject to any disclaimer, the term of this patent is extended or adjusted under 35 U.S.C. 154(b) by 196 days.

(21) Appl. No.: 13/200,166

(22) Filed: Sep. 19, 2011

(65) Prior Publication Data

US 2013/0073743 A1  Mar. 21, 2013

(51) Int. Cl.
*G06F 15/173* (2006.01)
*H04L 29/08* (2006.01)
*H04L 12/701* (2013.01)
*H04L 29/06* (2006.01)

(52) U.S. Cl.
CPC ............ *H04L 67/1006* (2013.01); *H04L 29/06* (2013.01); *H04L 45/00* (2013.01); *H04L 67/1027* (2013.01); *H04L 67/142* (2013.01); *H04L 67/146* (2013.01)

(58) Field of Classification Search
CPC ................................ H04L 45/00; H04L 29/26
USPC ........................... 709/236–238; 370/235–237
See application file for complete search history.

(56) References Cited

U.S. PATENT DOCUMENTS

| | | | |
|---|---|---|---|
| 6,763,467 B1 | 7/2004 | Radatti et al. | |
| 7,349,979 B1 | 3/2008 | Cieslak et al. | |
| 7,401,146 B1 | 7/2008 | Menditto et al. | |
| 8,228,798 B2 * | 7/2012 | Yegani et al. | 370/235 |
| 8,788,822 B1 * | 7/2014 | Riddle | 713/169 |
| 2004/0193677 A1 | 9/2004 | Dar et al. | |
| 2004/0215770 A1 * | 10/2004 | Maher et al. | 709/224 |
| 2005/0183139 A1 | 8/2005 | Goddard | |
| 2007/0143477 A1 | 6/2007 | Kaminsky et al. | |
| 2007/0297333 A1 * | 12/2007 | Zuk et al. | 370/235 |
| 2008/0049786 A1 * | 2/2008 | Ram et al. | 370/468 |
| 2008/0101233 A1 * | 5/2008 | Shi et al. | 370/235 |
| 2009/0040941 A1 * | 2/2009 | Yang | 370/253 |
| 2010/0250757 A1 | 9/2010 | Akhter et al. | |
| 2010/0271964 A1 * | 10/2010 | Akhter et al. | 370/252 |
| 2010/0284411 A1 * | 11/2010 | Mirani et al. | 370/400 |
| 2011/0064093 A1 * | 3/2011 | Mattson et al. | 370/474 |

(Continued)

FOREIGN PATENT DOCUMENTS

EP          1094649 A2      4/2001

OTHER PUBLICATIONS

Davis, "Cisco Administration 101: Monitor Network Traffic with NetFlow."*

*Primary Examiner* — Chris Parry
*Assistant Examiner* — Weiwei Stiltner
(74) *Attorney, Agent, or Firm* — Cindy Kaplan (57) ABSTRACT

In one embodiment, a method includes receiving session information at a traffic interceptor in communication with a plurality of service devices, the session information transmitted from one of the service devices and identifying flows associated with a session and the service device associated with the session, storing the session information at the traffic interceptor, and transmitting traffic received at the traffic interceptor to the service device selected based on the session information. An apparatus is also disclosed.

19 Claims, 4 Drawing Sheets

(56) References Cited

U.S. PATENT DOCUMENTS

| | | | |
|---|---|---|---|
| 2011/0173334 A1* | 7/2011 | Shah | 709/228 |
| 2011/0252327 A1* | 10/2011 | Awasthi et al. | 715/736 |
| 2011/0310894 A1* | 12/2011 | Karino | 370/389 |
| 2011/0314145 A1* | 12/2011 | Raleigh et al. | 709/224 |
| 2012/0092992 A1* | 4/2012 | Pappas et al. | 370/235 |
| 2012/0191873 A1* | 7/2012 | Himeno et al. | 709/242 |
| 2012/0224477 A1* | 9/2012 | Balasubramanian et al. | 370/230 |

* cited by examiner

| FLOW/SESSION | SERVICE DEVICE |
|---|---|
| {protocol, source-IP, source-port, dst-IP, dst-port} | A |
| {protocol, source-IP, source-port, dst-IP, dst-port} | A |
| {protocol, source-IP, source-port, dst-IP, dst-port} | B |
| {protocol, source-IP, source-port, dst-IP, dst-port} | B |

FIGURE 4A

| FLOW/SESSION | SERVICE DEVICE |
|---|---|
| {protocol, source-IP, dst-IP, dst-port} | A |
| {protocol, source-IP, dst-IP, dst-port} | A |
| {protocol, source-IP, dst-IP, dst-port} | B |
| {protocol, source-IP, dst-IP, dst-port} | B |

FIGURE 4B

| FLOW/SESSION | SERVICE DEVICE |
|---|---|
| {source-IP, dst-IP, dst-port} | A |
| {source-IP, dst-IP, dst-port} | A |
| {source-IP, dst-IP, dst-port} | B |
| {source-IP, dst-IP, dst-port} | B |

SERVICES CONTROLLED SESSION BASED FLOW INTERCEPTOR

TECHNICAL FIELD

The present disclosure relates generally to communication networks, and more particularly, to network traffic interception.

BACKGROUND

Network services are often deployed in the form of a cluster for scalability and high availability. Implementation of device clusters results in a need for a traffic interception device that can attract traffic of interest from the network, and distribute the traffic to service devices in the cluster. When distributing traffic to the cluster of service devices, a traffic interceptor needs to send all packets on a flow to the same service device, and all flows on a session to the same service device.

BRIEF DESCRIPTION OF THE FIGURES

Corresponding reference characters indicate corresponding parts throughout the several views of the drawings.

DESCRIPTION OF EXAMPLE EMBODIMENTS

Overview

In one embodiment, a method generally comprises receiving session information at a traffic interceptor in communication with a plurality of service devices, storing the session information at the traffic interceptor, and transmitting traffic received at the traffic interceptor to the service device selected based on the session information. The session information is transmitted from the service device and identifies flows associated with a session and the service device associated with the session.

In another embodiment, an apparatus generally comprises an interface for communication with a plurality of service devices, a processor for receiving session information transmitted from the service device and identifying flows associated with a session and the service device associated with the session, and transmitting traffic to the service device selected based on the session information. The apparatus further comprises memory for storing the session information.

In yet another embodiment, logic is encoded on one or more tangible computer readable media for execution and when executed operable to receive session information at a traffic interceptor in communication with a plurality of service devices, search the session information for a flow corresponding to a received packet, and identify the service device to transmit the packet based on the session information. The session information is transmitted from the service device and identifies flows associated with a session and the service device associated with the session.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For clarity, details relating to technical material that is known in the technical fields related to the embodiments have not been described in detail.

Network services such as WAAS (Wide Area Application Services) and firewall are often implemented in a cluster of service devices. A traffic interceptor attracts traffic of interest from a network and distributes traffic to service devices. When distributing traffic to the cluster of service devices, the traffic interceptor needs to be configured so that all packets on a specific flow (e.g., TCP (Transmission Control Protocol), UDP (User Datagram Protocol)) are sent to the same service device and all flows on a specific session are sent to the same service device. In order to address the first requirement, the interceptor can maintain five tuple based flow entries that are independently learned and maintained by looking at individual packets. The second requirement is difficult since it may be hard to identify flows associated with a session. For example, in a DCE (Distributed Computing Environment) RPC (Remote Procedure Call) session more than one TCP flow makes up a session and identifying the TCP flows that are part of the session requires layer 7 (L7) level knowledge. In another example, the service device may perform Network Address Translation (NAT), in which case the flow loses its identity (i.e., identity is transformed) after going through the service device. The association of the flow before NAT and after NAT is known only to the service device. This limits the capability of the interceptor and often interferes with applications built on sessions.

The embodiments described herein provide a flow interceptor operable to perform session aware traffic distribution by obtaining session information (e.g., application level knowledge) from a service device, which contains the knowledge. Since service devices typically operate at the same or higher OSI layer than the interceptor, they often have more information available for the flows and sessions. This information allows the interceptor to become session aware and perform its functions more accurately.

Figure 1:
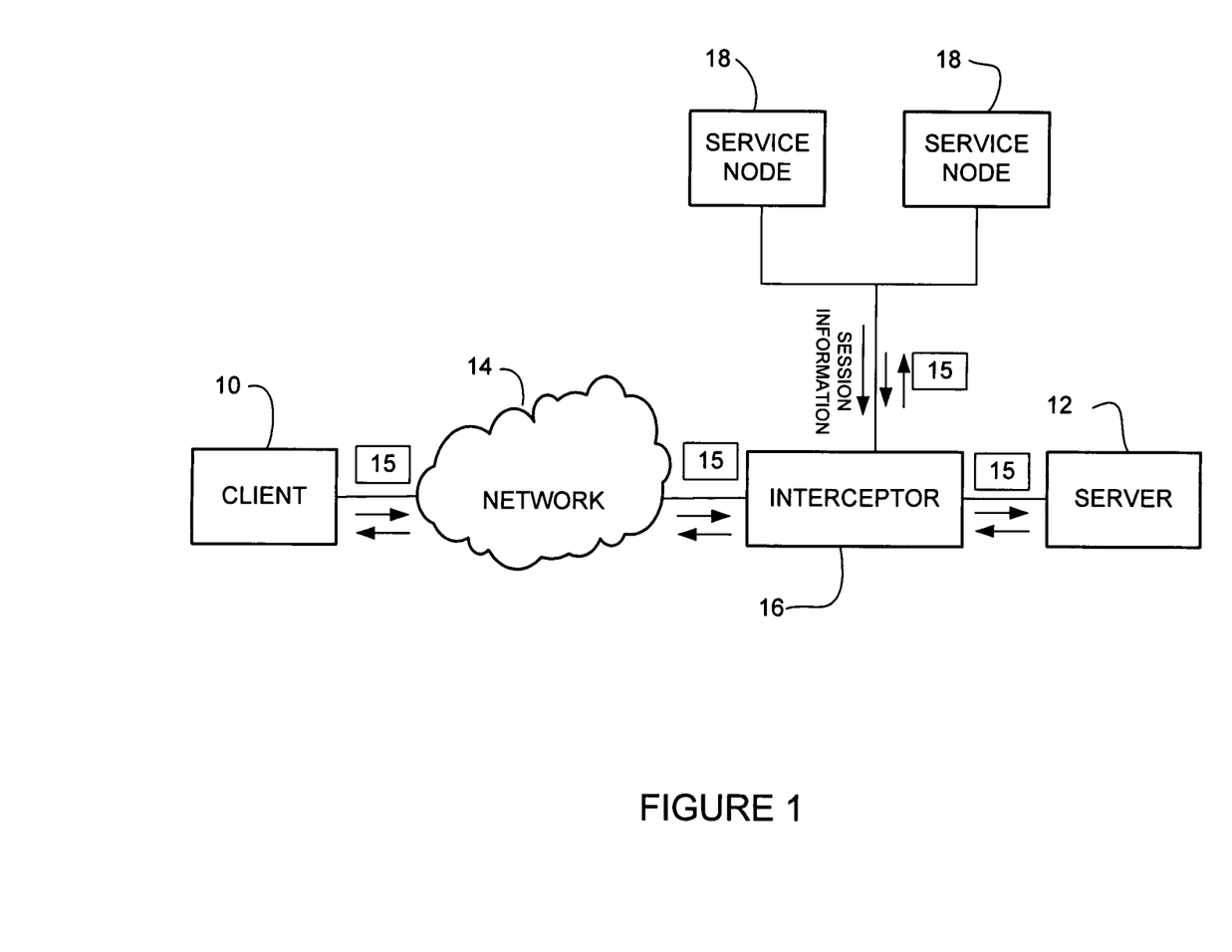
FIG. 1 illustrates an example of a network in which embodiments described herein may be implemented.

Referring now to the drawings, and first to FIG. 1, an example of a network in which the embodiments described herein may be implemented is shown. The embodiments operate in the context of a data communications network including multiple network devices (nodes) interconnecting communication paths for receiving and transmitting packets of information that propagate through the network. The example shown in FIG. 1 includes a client 10 in communication with a server 12 through a network 14. The client and server nodes 10, 12 may operate as a source or destination for traffic transmitted between the network devices. A traffic interceptor 16 is located in the communication path between the client 10 and server 12 and is also in communication with a cluster of service devices (nodes) 18. Traffic (packets 15) transmitted between the client 10 and server 12 may be intercepted by the interceptor 16 and transmitted to the service devices 18 for application of services.

The client node 10 may be a personal computer, mobile device, or any other device configured to communicate with server 12. The server 12 may belong to a data center or a virtual private cloud, for example. The server 12 may be a physical network device, logical device (e.g., virtual machine installed on server), or a mobile server, for example. In one example, the client 10 is located at a remote branch office and the server 12 is located at a data center.

The service device 18 may be, for example, a WAAS device (e.g., appliance or optimization engine configured to provide application specific acceleration or WAN (Wide Area Network) optimization capabilities), firewall, or any other network device operable to perform network services. The service device 18 may be a physical appliance, virtual appliance, router-integrated service module, or any other network device operable to perform a service (e.g., network address translation/port address translation, application performance improvements (optimization, acceleration), etc.) on network traffic.

For simplification, only two service nodes 18 are shown in FIG. 1, however, the interceptor 16 may be in communication with any number of service nodes and any number of clusters of service nodes, with each cluster providing a different service, for example. Also, there may be any number of client nodes 10 in communication with any number of servers 12 via one or more communication paths passing through interceptor 16. There may also be more than one interceptor 16 operating in a cluster, for example, to handle a large amount of traffic. In this case, session information is transmitted to each of the interceptors 16 or transmitted between interceptors, for use in directing the traffic to one of the service devices 18.

The network 14 may include one or more networks (e.g., local area network, metropolitan area network, wide area network, enterprise network, Internet, intranet, radio access network, public switched network, virtual private network, or any other network). Communication paths between the client 10 and server 12, and interceptor 16 and service devices 18 may include any number or type of intermediate nodes (e.g., routers, switches, gateways, or other network devices), which facilitate passage of data between the network devices.

As shown in FIG. 1, packets 15 are transmitted on communication paths between the client 10 and server 12, and between the interceptor 16 and service devices 18. A flow is a sequence of packets sent from a source to a destination that the source desires to label as a flow. The flow may be identified, for example, by a five tuple {protocol, source IP address, destination IP address, source port, destination port}. A session is a series of related flows between the client 10 and server 12. The session may be identified, for example, by a three tuple (e.g., {source IP address, destination IP address, destination port}), a four tuple (e.g., {source IP address, source port, destination IP address, destination port}, {protocol, source IP address, destination IP address, destination port}), or five tuples (e.g., identifying flows before and after address translation). It is to be understood that these are only examples and other information may be used to identify a session.

As described in detail below, the service device 18 is configured to send session information to the interceptor 16 and thereby control behavior of the interceptor by telling the interceptor how to redirect flows. The interceptor 16 uses the session information to identify traffic associated with a session so that the interceptor can perform session aware traffic distribution. The term 'session' as used herein may refer, for example, to a session (e.g., application session) comprising a plurality of flows, or a session comprising flows in which the identity of the flow changes (e.g., before and after network address translation).

The interceptor 16 may be implemented on a router (e.g., ASR (Aggregation Services Router), ISR (Integrated Services Router)), switch, gateway, firewall, load balancer, server, or other network device. The interceptor 16 may also be integrated with one or more of the service nodes 18 (e.g., network interface card integrated with service nodes). As described below, the embodiments may be implemented in software, hardware, or any combination thereof. For example, the interceptor 16 may be implemented on dedicated hardware on a WAAS device or may be implemented as a virtual machine on a server platform.

It is to be understood that the network shown in FIG. 1 and described herein is only an example and that the embodiments may be implemented in networks having different network topologies and network devices, without departing from the scope of the embodiments. Also, the protocols discussed herein are only examples and other protocols may be used without departing from the scope of the embodiments. For example, non-IP protocols may be used and encapsulation (e.g., IP GRE, IP-in-IP, L2 tunnels) may also be used.

Figure 2:
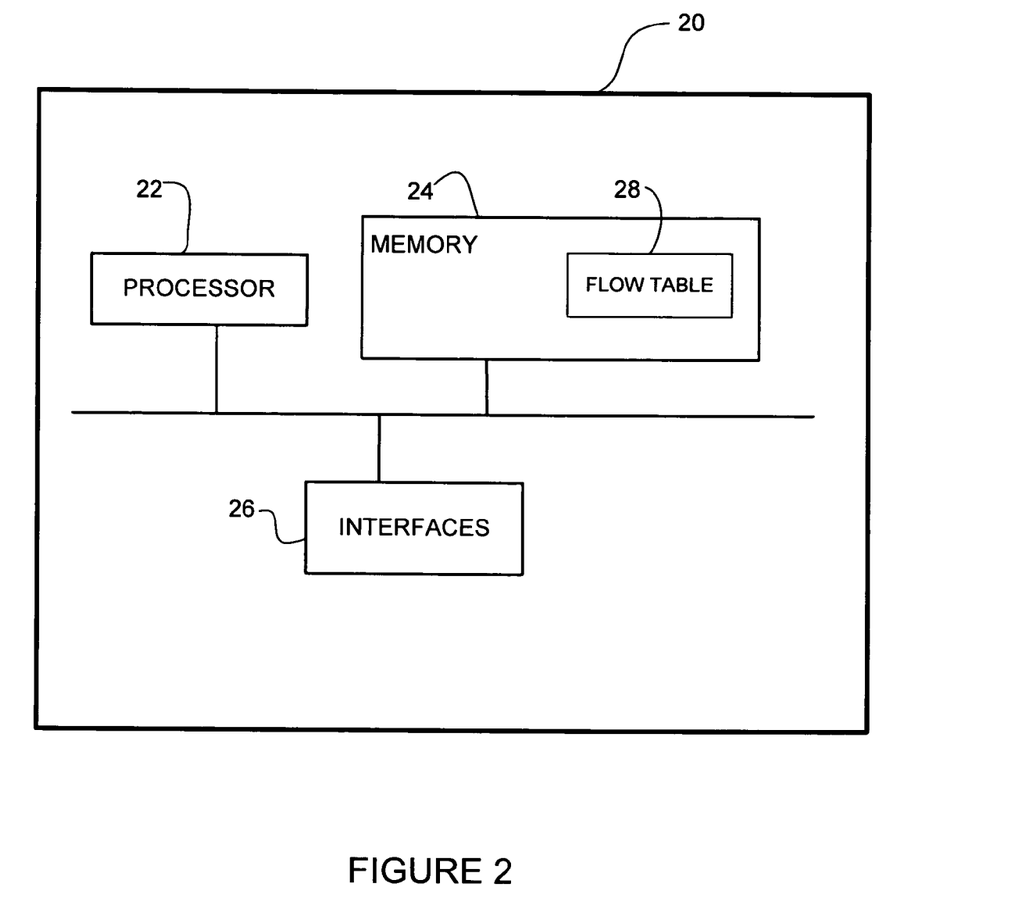
FIG. 2 depicts an example of a network device that may be used to implement the embodiments.

FIG. 2 illustrates an example of a network device (e.g., interceptor) 20 that may be used to implement the embodiments described herein. In one embodiment, the network device 20 is a programmable machine that may be implemented in hardware, software, or any combination thereof. The network device 20 includes one or more processor 22, memory 24, and network interfaces 26. Memory 24 may be a volatile memory or non-volatile storage, which stores various applications, operating systems, modules, and data for execution and use by the processor 22. For example, the memory 24 may store one or more flow tables 28 for use in identifying traffic and flows associated with a specific session and directing the traffic to one of the service devices 18.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 26 may comprise any number of interfaces (linecards, ports) for receiving data or transmitting data to other devices. For example, the apparatus may comprise one or more interfaces for communication with the service devices 18, an interface for communication with the client 10, and an interface for communication with the server 12. The interfaces 26 may include, for example, an Ethernet interface for connection to a computer or network.

It is to be understood that the network device 20 shown in FIG. 2 and described above is only an example and that different configurations of network devices may be used.

Figure 3:
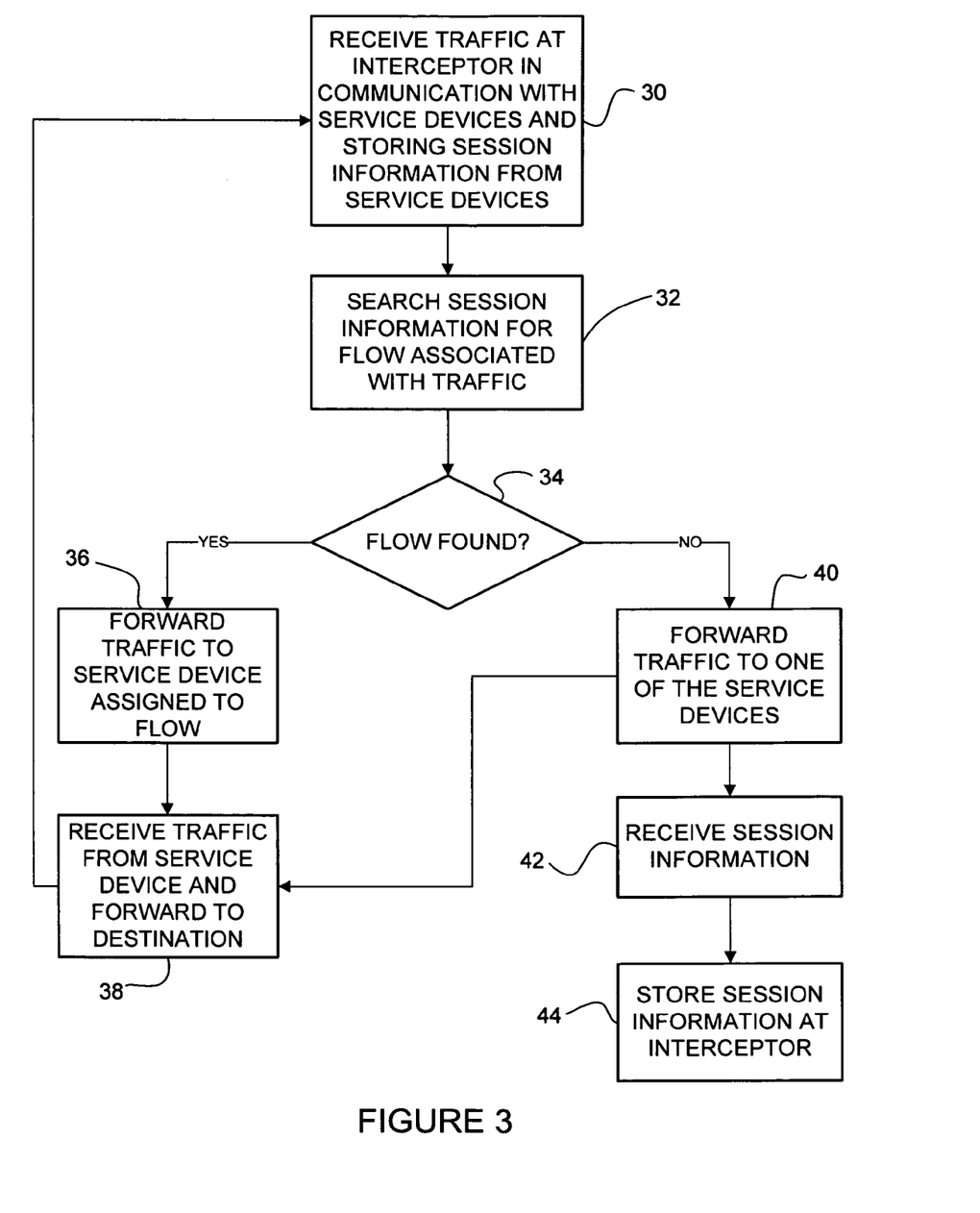
FIG. 3 is a flowchart illustrating an overview of a process for services controlled session based flow interception, in accordance with one embodiment.

FIG. 3 is a flowchart illustrating an overview of a process for services controlled session based flow interception, in accordance with one embodiment. As described above with respect to FIG. 1, the traffic interceptor 16 is in communication with a plurality of service devices 18 and stores session information received from the service devices. The session information identifies flows associated with a session and the service device associated with the session (e.g., the service device transmitting the session information). The session information may be received directly from the service device 18 or from another traffic interceptor 16. At step 30, the interceptor 16 receives traffic from client 10 (FIGS. 1 and 3). The interceptor 16 searches the session information for a flow associated with the received traffic (step 32). For example, the interceptor 16 may perform a lookup in flow table 28 using information contained in a received packet. If a match is found, the packet is forwarded to the service device 18 identified in the flow table (steps 34 and 36). After the service device 18 applies services to the traffic, it sends the traffic back to the interceptor 16, which forwards the traffic to the server 12 (step 38).

If there is no match found in the session information (e.g., first flow received at the interceptor belonging to a session), the traffic is sent by the interceptor 16 to one of the service devices 18 (steps 34 and 40). The service device 18 may be selected based on load balancing or other criteria. The service device 18 applies services to the traffic and sends the traffic back to the interceptor 16, which forwards the traffic to server 12 (step 38). The service device 18 also generates session information based on the received packet and transmits the session information to the interceptor 16 (step 42). For example, in the case of a DCE RPC session, the service device 18 may tell the interceptor 16 to redirect all of the connections that match the same {src-ip (source (e.g., client) IP address), dst-ip (destination (e.g., server) IP address), dst-port (destination port)} to the same service device. In another example, a service device 18 configured for performing firewall services identifies the transformation applied to a packet and informs the interceptor 16 about the {protocol, src-ip, src-port, dst-ip, dst-port} corresponding to before network address translation flow and after network address translation flow so that the interceptor can send the packets that match these flows to the same service device.

At step 44, the interceptor 16 stores the session information. For example, the interceptor 16 may create a flow entry in flow table 28 identifying the flow as part of a session and mapping the flow to the service device 18 from which the session information was received. The interceptor 16 uses the session information to send all of the matching connections, or packets matching before/after NAT flows to the same service device 18. This provides session aware traffic distribution for a session in which more than one flow makes up the session or one or more flows in a session have multiple identities.

It is to be understood that the process shown in FIG. 3 and described above is only one example and that steps may be added, removed, reordered, or combined without departing from the scope of the embodiments.

As described above with respect to step 44 in FIG. 3, the session information received from the service devices 18 is stored at the interceptor 16. The session information may be stored in one or more flow tables or any other data structure. In one example, the session information is stored as a flow entry comprising one or more flow identifiers and the service node assigned to the flow/session. The service nodes 18 may be identified by an address or any other identifier. The flow identifier may include any combination of source node identifier, destination node identifier, and protocol. The source and destination node identifiers may include, for example, an IP address or IP address and port.

Figure 4A:
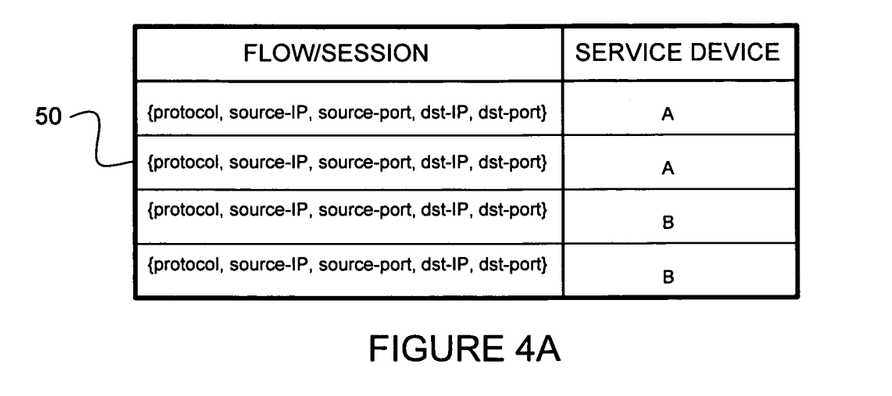
FIGS. 4A-4C illustrate examples of tables for storing session information at an interceptor in the network of FIG. 1.
Figure 4B:
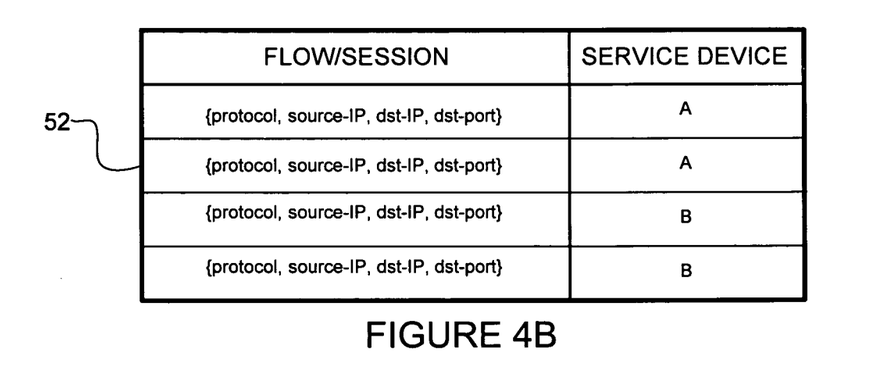
Figure 4C:
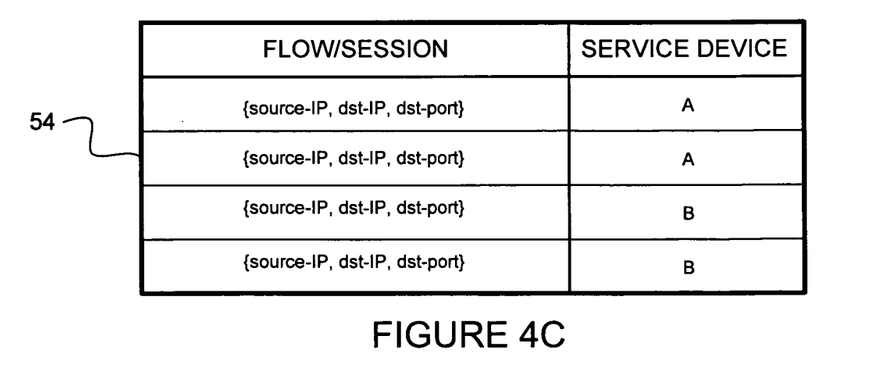

FIGS. 4A-4C illustrate examples of flow tables for storing session information. The interceptor 16 may include a five tuple flow table 50 (FIG. 4A), a four tuple flow table 52 (FIG. 4B), a three tuple flow table 54 (FIG. 4C), or any combination thereof. In the example shown in FIG. 4A, the table 50 includes a plurality of entries each comprising a five tuple and a corresponding service device (e.g., A, B, . . . ). The flow entries may identify, for example, a flow before network address translation and a flow after network address translation, both of which belong to the same session and are assigned to the same service device 18. As shown in FIG. 4B, the interceptor 16 may maintain a four tuple flow table 52 with source port variable. The interceptor 16 may also maintain a three tuple flow table 54 (FIG. 4C) with protocol and source port variable. When packets are received at the interceptor 16, a lookup is performed in all of the tables and the lookup result from the most specific table is used to identify the source device 18 to which the interceptor redirects the flow. It is to be understood that the tables shown in FIGS. 4A-4C are only examples and that other data structures storing different flow information may be used, without departing from the scope of the embodiments.

The session information may be transmitted from the service device 18 to the interceptor 16 along with the network traffic 15 or in a separate communication. In one embodiment, a header containing the session information is added to a packet. The following is an example of a packet format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
:                            MAC                                : (a)
:                                                               :
+-+-+-+-+-+-+-+-+-+-+-+-+-+-+-+-+-+-+-+-+-+-+-+-+-+-+-+-+-+-+-+-+
:                    IP Header (Proto = 47)                     : (b)
:                                                               :
+-+-+-+-+-+-+-+-+-+-+-+-+-+-+-+-+-+-+-+-+-+-+-+-+-+-+-+-+-+-+-+-+
| GRE Flags & Version (0x0000)  | ServiceWire EtherType (0x8921)| (c)
+-+-+-+-+-+-+-+-+-+-+-+-+-+-+-+-+-+-+-+-+-+-+-+-+-+-+-+-+-+-+-+-+
|0|0|0|0|    Length (X+Y+2)     |   Type (0x10)  |Length (X+Y)  | (d)
+-+-+-+-+-+-+-+-+-+-+-+-+-+-+-+-+-+-+-+-+-+-+-+-+-+-+-+-+-+-+-+-+
:                         InterSMC Info                         : (e)
:                       (session information)                   :
+ -  -  -  -  -  -  -  -  -  -  -  -  -  -  -  -  -  -  -  -  -+
:             Optional Egress Info portion of InterSMC Info     : (f)
:                                                               :
+-+-+-+-+-+-+-+-+-+-+-+-+-+-+-+-+-+-+-+-+-+-+-+-+-+-+-+-+-+-+-+-+
: VERSION |         IP Header & Payload . . .                   : (g)
:                                                               :
+-+-+-+-+-+-+-+-+-+-+-+-+-+-+-+-+-+-+-+-+-+-+-+-+-+-+-+-+-+-+-+-+
```

The portion of the frame labeled (a)-(f) is the additional header/encapsulation that is added to the packet by the service node 18 to provide session information to the interceptor 16. The portion labeled (g) is the original header and payload of the packet. In the example shown above, the new header includes: (a) MAC address of interceptor; (b) IP header for GRE (Generic Routing Encapsulation); (c) GRE header; (d) Service Wire TLV (type length value) header and Inter-WAAS TLV; (e) session information (corresponds to X bytes in length); and (f) optional egress information (corresponds to Y part in length).

Upon receiving the packet from the service device 18, the interceptor 16 strips the header ((a)-(f)) and forwards the packet to the destination identified in the packet. The encapsulation shown above is for an L3 (Layer 3) GRE tunnel. It is to be understood that the above format is only an example and that other tunneling protocols or encapsulation formats may be used. For example, an L2 (Layer 2) MAC-in-MAC encapsulation may also be used.

The following describes examples in which the embodiments may be implemented. It is to be understood that these are only examples and that the embodiments may be used in other implementations.

In one example, a plurality of flows are related and together make up an application session (e.g., MAPI (Messaging Application Programming Interface), SIP (Session Initiation Protocol), SCCP (Skinny Call Control Protocol), H.323, etc.). As previously described, all flows that make up an application session need to be sent to the same service node 18 for the service to perform its functions correctly. For example, MAPI application sessions may consist of more than one (simultaneous) TCP flow and all of the flows belonging to one session need to be sent to the same service device 18 (e.g., WAAS optimization engine). These flows have different source ports. Flows with the same {client-ip, server-ip, server-port} tuple are sent to the same optimization engine.

In another example, a connection reuse feature reuses WAN (wide area network) segments of previous end-to-end connections for new LAN (local area network) segments, which have different source ports. Flows with the same {client-ip, server-ip, server-port} tuple are sent to the same optimization engine at the edge of the network. Flows with a given {client-ip, client-port, server-ip, server-port} tuple are sent to the same optimization engine at the core network.

In another example, an SSL (Secure Sockets Layer) session may reuse pre-established SSL sessions for new TCP flows from the same client to the same server/port. Flows with the same {client-ip, server-ip, server-port} tuple are sent to the same service device (e.g., optimization engine). The embodiments may also be used for HTTP (Hypertext Transfer Protocol) connection reuse, etc.

A firewall may use an application session to open up necessary pin-holes and to allow the application session to go through. A firewall may also provide protocol fixes/inspects for many protocols. In one example, the firewall may need to update the payload as well as the outer TCP/IP header due to network address translation or port address translation. Both sides of an end-to-end flow (before and after translation) should be sent to the same service node. In this case, the same firewall needs to be able to get both the before and after NAT segments. The interceptor 16 stores the before and after NAT flow association and sends the packets that match the flows to the same firewall (service device).

In order to handle session oriented protocols, the firewall can add additional flow entries to handle future sessions. In this case, five tuples may be used to identify flows that need to be sent to the same service device 18. Examples include FTP (File Transfer Protocol) (control and data connections need to be sent to the same service device 18), DCE RPC (EPM (End Point Mapper) and data connections), RSH (remote shell) (data connection is from client to server, error connection is from server to client), RTSP (Real Time Streaming Protocol) (control (TCP) and two data connections (UDP) need to be sent to the same service device), SIP/SCCP (signaling connection (TCP) is from client to call-manager, data connection (UDP) is from client to the destination), H.323 (control and signaling (TCP) connections and multiple UDP connections), etc.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving session information at a traffic interceptor in communication with a plurality of service devices, said session information transmitted from one of the service devices and identifying flows associated with a session and the service device associated with the session, wherein the traffic interceptor is located in a communication path between a source and a destination and operable to intercept traffic on the communication path and transmit the traffic to one of the service devices;
   storing said session information at the traffic interceptor, wherein storing said session information comprises storing a flow entry mapping the flows associated with the session to the service device transmitting the session information;
   intercepting traffic received at the traffic interceptor on the communication path;
   searching said session information for a flow corresponding to the traffic, wherein searching comprises performing a lookup in a flow table containing said session information to select one of the service devices to transmit the traffic;
   identifying the service device to transmit the traffic based on said session information;
   transmitting the traffic received at the traffic interceptor to the service device selected based on said session information;
   receiving the traffic back from the service device after the service device applies services to the traffic; and
   forwarding the traffic to the destination;
   wherein the session comprises an application session comprising a series of related flows, each of the flows comprising a sequence of packets sent from the source to the destination; and
   wherein the traffic interceptor uses said session information to identify the traffic associated with said session to perform session aware traffic distribution said session information comprising application level information.

2. The method of claim 1 wherein said session information comprises three or more of a source address, a source port, a destination address, a destination port, and a protocol.

3. The method of claim 1 wherein the service devices are configured for wide area application services.

4. The method of claim 1 wherein the service devices are configured for firewall services.

5. The method of claim 1 wherein said session information identifies a flow before and after address translation.

6. The method of claim 1 wherein said plurality of service devices control behavior of the traffic interceptor by instructing the traffic interceptor how to direct traffic flow with said session information.

7. The method of claim 1 further comprising intercepting traffic wherein no flow corresponding to the traffic is identified in the search and further comprising selecting one of the service devices to transmit the traffic based on load balancing among said plurality of service devices.

8. The method of claim 1 wherein forwarding the traffic received from the service device further comprises removing a header from a packet received from the service device before forwarding the traffic.

9. The method of claim 1 wherein intercepting traffic comprises attracting traffic of interest from a network for distribution to the service devices and application of services at the service devices before the traffic is returned to the service devices.

10. An apparatus comprising:
    an interface for communication with a plurality of service devices;
    a processor for receiving session information transmitted from one of the service devices, intercepting traffic received at the traffic interceptor, searching said session information for a flow corresponding to the traffic, identifying one of the service devices to transmit the traffic based on said session information, transmitting traffic to the service device selected based on said session information, receiving the traffic back from the service device after the service device applies services to the traffic, and forwarding the traffic to the destination, wherein searching comprises performing a lookup in a flow table containing said session information to select one of the service devices to transmit the traffic; and memory for storing said session information, wherein said memory comprises a table for storing a flow entry mapping the flows associated with the session to the service device transmitting the session information;

wherein the apparatus is configured for operation in a communication path between a source and a destination and operable to intercept the traffic on the communication path and transmit the traffic to one of the service devices and wherein the session comprises an application session comprising a series of related flows, each of the flows comprising a sequence of packets sent from the source to the destination; and wherein the traffic interceptor uses said session information to identify the traffic associated with said session to perform session aware traffic distribution, said session information comprising application level information.

11. The apparatus of claim 10 wherein said session information comprises three or more of a source address, a source port, a destination address, a destination port, and a protocol.

12. The apparatus of claim 10 wherein the service devices are configured for wide area application services.

13. The apparatus of claim 10 wherein the service devices are configured for firewall services.

14. The apparatus of claim 10 wherein said session information identifies a flow before and after address translation.

15. The apparatus of claim 10 wherein the service devices operate at a higher OSI layer than the apparatus.

16. The apparatus of claim 10 wherein the apparatus is not session aware until it receives said session information.

17. The apparatus of claim 10 wherein said session information instructs the apparatus how to redirect the traffic.

18. Logic encoded on one or more non-transitory computer readable media for execution and when executed operable to:

receive session information at a traffic interceptor in communication with a plurality of service devices, said session information transmitted from one of the service devices and identifying flows associated with a session and the service device associated with the session, wherein the traffic interceptor is configured for operation in a communication path between a source and a destination and operable to intercept the traffic on the communication path and transmit the traffic to one of the service devices;

store said session information, wherein storing said session information comprises storing a flow entry mapping the flows associated with the session to the service device transmitting the session information;

intercept traffic received at the traffic interceptor on the communication path; search said session information for a flow corresponding to the traffic, said search comprising a lookup in a flow table containing said session information to select one of the service devices to transmit the traffic:

identify the service device to transmit the packet based on said session information; and transmit the traffic received at the traffic interceptor to the service device selected based on said session information;

receive the traffic back from the service device after the service device applies services to the traffic;

forward the traffic to the destination;

wherein the session comprises an application session comprising a series of related flows, each of the flows comprising a sequence of packets sent from the source to the destination; and wherein the traffic interceptor uses said session information to identify the traffic associated with said session to perform session aware traffic distribution, said session information comprising application level information.

19. The logic of claim 18 wherein the service device generates session information based on the received traffic and transmits said session information to the traffic interceptor.

* * * * *